April 20, 1937.                    A. VIGNE                    2,078,044
                              WORM GEAR BEARING
                              Filed Oct. 11, 1935
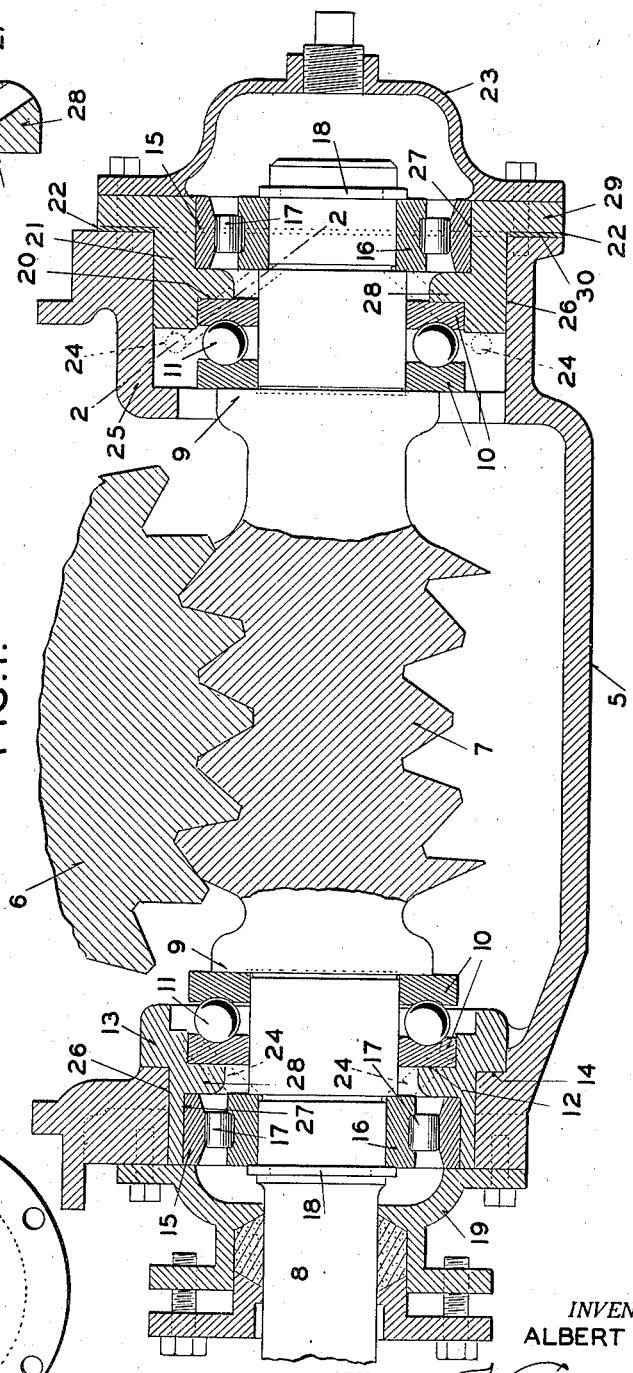
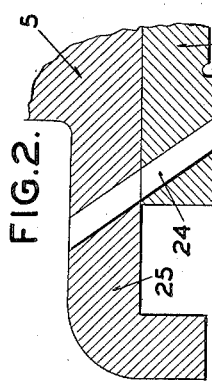
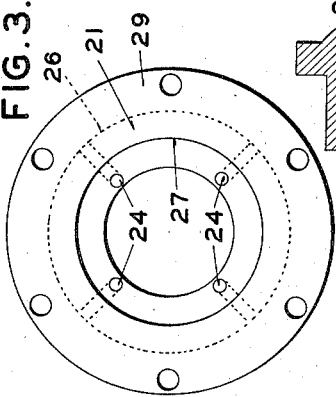
INVENTOR.
ALBERT VIGNE
BY
            ATTORNEY.

Patented Apr. 20, 1937

2,078,044

UNITED STATES PATENT OFFICE 2,078,044

WORM GEAR BEARING

Albert Vigne, Webster Groves, Mo., assignor to National Bearing Metals Corporation, St. Louis, Mo., a corporation of New York Application October 11, 1935, Serial No. 44,496

1 Claim. (Cl. 308—174)

Worm gear bearings as heretofore constructed comprise a radial bearing at one end and a radial bearing at the other in combination with a thrust bearing, the thrust being taken on an inner race or plate secured to the worm shaft. The end play of the worm is adjusted by means of a nut on the threaded end portion of the worm shaft but cannot be limited to less than the end play inherent in the radial bearings themselves. Further, such bearings as have been used are tapered roller or combination thrust and radial type ball bearings which have raceways parallel to the worm shaft with inherent end play of several thousandths of an inch. My invention provides one radial and one thrust bearing on each end of the worm shaft, the thrust bearing being adjacent the worm and arranged to take the thrust from generous thrust collars so located that there is a minimum distance between them and having races at right angles to the worm shaft so that lost motion is held to a minimum.

By the construction above briefly set forth I am enabled to accurately locate the axis of the worm shaft with relation to the axis of the worm wheel and at the same time prevent end movement of the worm. The proper relation between the worm and worm gear is thus maintained with the necessary degree of accuracy to obviate the difficulties heretofore encountered in this type of gearing. This is one of the main objects of my invention.

Another object of my invention is to locate the bearings by means of renewable bushings requiring only plane cylindrical and flat faces to position them with the necessary degree of accuracy, thus providing a simple and economical method of renewing worn bearings.

A further object of my invention is to provide means for lubricating the radial bearings from the main oil supply.

In the accompanying drawing, which illustrates one form of worm gear bearing made in accordance with my invention, Figure 1 is a vertical, longitudinal section; Figure 2 is an enlarged section taken on the line 2—2 of Figure 1; and Figure 3 is an end view of one of the bushings.

The numeral 5 represents the worm gear housing supporting the worm gear or wheel 6 and the worm 7. The supporting means of the gear is not shown as it may be of any desired kind and forms no part of the present invention. The worm is formed integral with the worm shaft 8 and is provided at each end with a thrust collar 9, preferably also formed integral with the shaft. Each of these collars engages with one of a pair of thrust ball races 10 between which are situated balls 11. At the driving end of the shaft one of the ball races 10 seats against a shoulder 12 of a removable bushing 13 pressed into position from the inside of the gear housing and having its position determined by a shoulder 14 seating against a cooperating face or shoulder on the housing. The longitudinal position of the collar 9 is, therefore, determined by the relative location of the shoulders 12 and 14, which may be determined with great accuracy by the machining of these shoulders. The radial bearing at the driving end of the shaft comprises an outer race 15, an inner race 16, and rollers 17 situated between them. The inner race may be secured by lock ring 18 and the outer race by a cap 19 providing a stuffing box for the shaft.

At the opposite end of the shaft the outer race 10 of the thrust bearing bears against a shoulder 20 on a removable bushing 21 pressed into the gear housing from the outside. This bushing carries a radial bearing comprising outer and inner races 15 and 16 and rollers 17 like the radial bearing at the opposite end of the housing.

It will be seen that each of the removable bushings 13 and 21 comprises an outer cylindrical surface 26 seating in a bore in the housing and an inner cylindrical surface 27 to receive a radial bearing, thus securing the required distance between the axis of the shaft and the center of the worm wheel. Further, each bushing is provided with an inwardly projecting flange 28, the opposing sides of which form the stop shoulders 12 and 20 for the thrust bearings. The bushing 21 is provided with an outwardly projecting flange 29 forming a stop shoulder 30 facing in the same direction as shoulder 14 of the bushing 13. By the use of a shim 22 between the shoulder 30 and the end of the housing, the distance between the shoulders 14 and 30 and, consequently, that between the thrust bearing stop shoulders 12 and 20, can be accurately determined. The end of the gear housing is closed and the bushing 21 held in position by a cover plate 23 bolted or otherwise secured in position.

The gear casing forms an oil reservoir for supplying lubricant to the worm and worm wheel and to the thrust bearings. The radial bearings, however, are substantially sealed off from the lubricant reservoir. To supply oil to the radial bearings I provide oil passages 24 through bushings 13 and 21. At the right hand end of the casing these passages are extended through a flange 25 with which the casing is provided at the end, as best shown in Figure 2.

When torque is applied to the worm shaft it is supported radially with respect to the worm wheel by the radial bearings comprising the races 15 and 16 and rollers 17. It is supported in the direction of its length by the thrust bearings comprising races 10 and balls 11. The maximum differential temperature between the worm shaft and the housing is approximately 60 degrees F. resulting in differential expansion of the worm shaft between the thrust collars 9 and of the housing between faces 14 and 20 of about five ten-thousandths of an inch. By adjusting end play with shim 22 to one-thousandth of an inch, a running adjustment is provided which is ample to prevent preloading of the thrust bearings from heat expansion.

Having fully described my invention, what I claim as new and desire to secure by Letters Patent of the United States is:

In a device of the class described, the combination with a housing, of a shaft therein provided with a worm, a thrust collar adjacent one end of the worm, an opening in said housing terminating in an internal shoulder, a removable bushing provided with an inwardly projecting flange, said bushing positioned in said opening and provided with an outwardly projecting flange seating against said shoulder, a thrust bearing positioned between said inwardly projecting flange and the collar, and a radial bearing positioned between the shaft and bushing at the opposite side of the flange.

ALBERT VIGNE.